April 27, 1954   H. B. JAMES   2,677,076
OVERVOLTAGE PROTECTION FOR ALTERNATING CURRENT GENERATORS
Filed Dec. 8, 1951
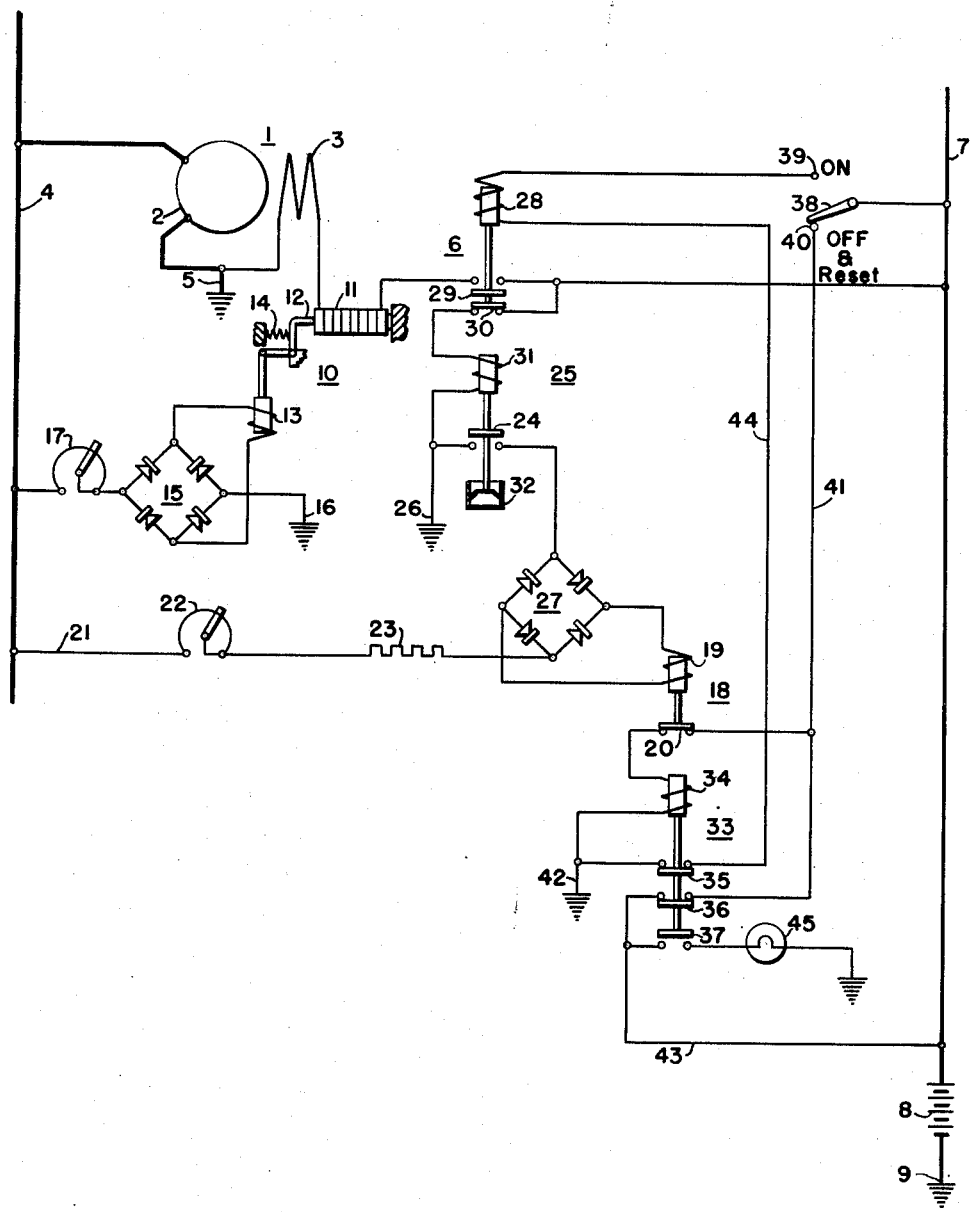
WITNESSES:
John E. Healy
Wm. B. Sellers.
INVENTOR
Homer B. James
BY F. P. Lyle
ATTORNEY Patented Apr. 27, 1954

2,677,076

UNITED STATES PATENT OFFICE 2,677,076

OVERVOLTAGE PROTECTION FOR ALTERNATING CURRENT GENERATORS

Homer B. James, Lima, Ohio, assignor to Westinghouse Electric Corporation, East Pittsburgh, Pa., a corporation of Pennsylvania Application December 8, 1951, Serial No. 260,592

14 Claims. (Cl. 317—13)

The present invention relates to the control and protection of alternating-current generators, and more particularly to a control circuit for providing overvoltage protection for such generators.

While the usefulness of the present invention is not restricted to any specific type of generator, it is especially suitable for providing overvoltage protection for alternating-current generators intended for operation over a wide speed range, such as are used in variable-frequency alternating-current aircraft electrical systems. Such systems are often used on aircraft for supplying loads which are not affected by frequency variation, such as heating and lighting loads, since aircraft generators are usually driven from a main engine of the airplane and the use of a variable-frequency system permits elimination of the constant-speed drive which is required for a constant-frequency system, thus making possible a considerable saving in weight.

Protection against abnormal conditions must, of course, be provided in such systems, and one of the most serious conditions is overvoltage of the generator, which may be very damaging both to the generator itself and to the loads connected to the system. In providing overvoltage protection for wide-speed-range alternators, however, certain problems are encountered which are not present, or are less serious, in other types of machines. When field excitation is applied to such a generator to bring it up to voltage, especially when it is running at relatively high speed, there is a transient overshoot of the voltage due to the inherent delays in the voltage regulator. That is, the voltage will rise above the desired voltage for which the regulator is set and then drop back to the proper value. This transient overvoltage may be quite severe, but it can be tolerated as it is of very brief duration, and it is necessary to prevent operation of the overvoltage protection on this initial transient overvoltage, which would prevent putting the generator into use. This could be done, of course, by providing a suitable time delay in the overvoltage relay, but this is not a satisfactory solution of the problem, since such a time delay would impair the protective characteristics desired during normal operation.

Another problem in the protection of wide-speed-range machines is that such machines usually have a relatively high residual voltage, which may be as high as 50% of the normal rated voltage. That is, when the machine is running at high speed with no field excitation, the generated voltage due to the residual magnetism of the magnetic circuit may be as high as 50% of the normal rated voltage. Overvoltage protective relays are normally designed to have a relatively low drop-out voltage, so that when utilized with a machine having such a high residual voltage, the relay may be held in its actuated position by the residual voltage after it has once operated. This would make it impossible to restore the machine to service after an overvoltage condition has occurred without actually bringing the machine to rest to allow the relay to drop out, which is usually impractical in the case of aircraft generators since they are directly driven by a main engine of the airplane.

The principal object of the present invention is to provide a control and protective system for an alternating-current generator which will deenergize the generator field in response to overvoltage, but which will not operate on the transient overvoltage occurring when the field is initially energized.

Another object of the invention is to provide a control and protective system for alternating-current generators utilizing an overvoltage relay for effecting deenergization of the generator field in response to overvoltage, and in which means are provided for temporarily making the overvoltage relay inoperative when the generator field is deenergized and subsequently reenergized, so that the relay positively drops out after operation and is prevented from operating during the initial build-up transient.

A further object of the invention is to provide a control and protective system for alternating-current generators in which the field of the generator is deenergized in response to overvoltage and which is trip-free, so that the field cannot again be energized after operation of the overvoltage protection until the system has been manually reset.

More specifically, the invention provides a control and protective system for an alternating-current generator having an overvoltage relay which effects deenergization of the generator field in response to overvoltage, and which also includes a time-delay relay for interrupting the sensing circuit of the overvoltage relay when the field is deenergized, to insure that the relay will drop out, and which reestablishes the sensing circuit with sufficient time delay, when the field is reenergized, to prevent operation of the overvoltage relay on the initial transient overvoltage. The system also includes a lockout relay which controls the energizing circuit of a field relay for effecting connection of the generator field to the source of excitation, the lockout relay being arranged to prevent reenergization of the field relay after operation of the overvoltage relay until the system has been manually reset, so that the system is electrically trip-free.

The invention will be more fully understood from the following detailed description, taken in connection with the accompanying drawing, the single figure of which is a schematic wiring diagram showing an illustrative embodiment of the invention.

The invention is shown in the drawing embodied in a control and protective system for an alternating-current generator 1. The generator 1 is shown as a single-phase generator having an armature member 2 and a field winding 3. One terminal of the armature 2 is connected to a load bus 4 and the other terminal is connected to ground at 5. One terminal of the field winding 3 is connected to a suitable source of direct-current excitation by means of a field relay 6, and the other terminal is connected to ground, preferably also at 5. The system is shown as utilizing a ground return for both the alternating and direct current circuits, since this is preferable for aircraft systems because of the saving in weight, but it will be apparent that separate wire return circuits might be used if desired. In the illustrated embodiment of the invention, direct-current excitation for the field winding 3 is provided from a direct-current bus 7, which may be supplied from any suitable source of direct current, shown diagrammatically as a battery 8, one terminal of which is connected to the bus 7 and the other terminal to ground at 9. While the invention is shown applied to a single-phase generator excited from a direct-current bus, it will be apparent that it is not limited to this particular type of generating system, but may be applied to any type of alternating current generator with any suitable source of excitation.

The output voltage of the alternator 1 is controlled by a voltage regulator 10, which is shown as a carbon pile regulator having a carbon pile 11 connected in series with the field winding 3 to control the field current. The resistance of the carbon pile 11 is varied by varying the pressure applied to it by a pressure device 12 of any suitable type, which is controlled by a coil 13 acting in opposition to a spring 14. The coil 13 is energized in response to the voltage of the alternator 1, and is shown as being energized through a single-phase rectifier bridge 15 connected across the generator voltage between the load bus 4 and ground 16. A voltage adjusting rheostat 17 may be connected in series with the rectifier 15 to adjust the generator voltage.

Overvoltage protection is provided by means of an overvoltage relay 18 which has an operating coil 19 and a normally closed contact 20. The relay 18 is adjusted to pick up and open its contact 20 when the voltage applied to the operating coil 19 exceeds a predetermined value corresponding to the maximum permissible voltage of the generator 1. The relay 18 preferably has inverse time delay characteristics so as to operate more rapidly on higher overvoltages. The coil 19 is energized through a single-phase rectifier bridge 27 which is connected across the generator voltage in a sensing circuit which extends from the bus 4 through a conductor 21, a voltage adjusting rheostat 22, a resistor 23, the rectifier 27, and the contact 24 of a time-delay relay 25 to ground 26.

The field relay 6, referred to above, has an operating coil 28 adapted to be energized from the direct-current bus 7, and has a normally open contact 29 and a normally closed contact 30. The normally open contact 29 is connected in series with the generator field winding 3 to connect the field winding to the direct-current bus 7 when the field relay 6 is energized. The normally closed contact 30 is connected in series with the operating coil 31 of the time-delay relay 25 to energize the relay 25 from the direct-current bus 7 when the field relay 6 is deenergized. The time-delay relay 25 is adapted to open its contact 24 substantially instantaneously when the relay 25 is energized and to close its contact 24 with a definite time delay when the relay is deenergized, any suitable time delay mechanism, indicated diagrammatically at 32, being provided for that purpose. As indicated above, the contact 24 is connected in the sensing circuit of the overvoltage relay 18 to control the overvoltage relay, so that the relay 18 is made temporarily inoperative when the relay 25 is energized.

A lockout relay 33 is also provided having an operating coil 34 which is connected to the direct-current bus 7 in series with the contact 20 of the overvoltage relay 18. The lockout relay 33 has contacts 35 and 36 which are closed when the relay is energized and a contact 37 which closes when the relay is deenergized. The contact 35 is connected to control the energization of the field relay 6, as hereinafter described.

A manual switch 38 is provided for controlling the operation of the system. The switch 38 has an "on" contact 39 and an "off and reset" contact 40, and is adapted to connect these contacts alternatively to the direct-current bus 7. The "on" contact 39 is connected to the operating coil 28 of the field relay 6, while the contact 40 is connected to control the lockout relay 33.

The operation of this system is as follows. Assume that the generator 1 is running at normal speed and it is desired to apply excitation and bring the generator up to voltage. The switch 38 under these circumstances, when the generator is not in service, will be on the contact 40, as shown in the drawing. The field relay 6 is deenergized so that the contact 29 is open, while the contact 30 is closed and connects the coil 31 of the time-delay relay 25 directly between the direct-current bus 7 and ground 26. The relay 25 is, therefore, energized and its contact 24 is open. The overvoltage relay 18 is deenergized, and its contact 20 is closed, since the sensing circuit for the relay 18 is interrupted by the contact 24. With the switch 38 on the contact 40, the lockout relay 33 is energized from the direct-current bus 7 through the conductor 41, the contact 20 of the overvoltage relay 18, and the coil 34 of the lockout relay 33 to ground 42. The lockout relay 33 is, therefore, in the energized position shown with the contacts 35 and 36 closed. The contact 36 of the lockout relay completes a sealing circuit for the relay from the bus 7 through conductor 43, contact 36, contact 20 of the relay 18 and coil 34 to ground. Thus the relay 33 is held in its energized position after it has once been energized by placing the switch 38 on the contact 40.

If it is now desired to energize the field winding 3 to bring the generator 1 up to voltage, the manual switch 38 is moved to the "on" contact 39. This completes an energizing circuit for the field relay 6 from the direct-current bus 7 through the contact 39, relay coil 28, conductor 44, and contact 35 of the lockout relay 33 to ground 42. The contact 35 remains closed when the switch 38 is operated since the relay 33 is held in its energized position by the sealing circuit through the contact 36. When the field relay 6 is thus energized by placing the switch 38 on the contact 39, it picks up and closes its contact 29 to connect the field winding 3 to the direct-current bus 7 to apply excitation to the generator. Simultaneously the field relay contact 30 is opened and deenergizes the time-delay relay 25, which drops out and closes its contact 24 with a suitable time delay which may, for example, be of the order of one-tenth second. This completes the sensing circuit of the overvoltage relay 18, so that it is connected to be responsive to the voltage of the generator 1, but because of the time delay in the relay 25, the sensing circuit is not completed until after the transient overshoot of the generator voltage which occurs when the field is initially energized has passed, so that the overvoltage relay 18 is prevented from operating on this transient overvoltage.

The system is now in its normal operating condition. If the generator voltage exceeds the value for which the overvoltage relay 18 is set, for any reason, the relay 18 picks up and opens its contact 20. This interrupts the energizing circuit for the coil 34 of the lockout relay 33 so that the lockout relay drops out and opens its contacts 35 and 36 and closes its contact 37. The contact 37 connects an indicating lamp 45 to the bus 7 through the conductor 43 to indicate operation of the relay. The contact 35 interrupts the energizing circuit of the field relay coil 28 so that the field relay 6 drops out and opens its contact 29, thus disconnecting the field winding 3 from the bus 7 and removing excitation from the generator. At the same time, the contact 30 of the field relay 6 closes and connects the coil 31 of the time-delay relay 25 to the bus 7, energizing the relay 25 to cause it to open its contact 24 substantially instantaneously. This interrupts the sensing circuit of the overvoltage relay 18 so that it drops out and recloses the contact 20. In this way positive dropout of the relay 18 is insured regardless of the magnitude of the residual voltage of the generator 1, which might be high enough to hold the relay 18 in its actuated position, which would make it impossible to again energize the field winding 3. When the lockout relay 33 opens its contact 36, the sealing circuit which maintained its energization is interrupted, so that when the relay 18 recloses its contact 20, the lockout relay 33 is not energized. Thus the system is electrically trip-free, since the field relay 6 cannot be reenergized after operation of the protective relay 18 until the system is manually reset.

When it is desired to reapply excitation to the generator 1, the switch 38 is manually moved to the "reset" contact 40, which energizes the lockout relay 33, and the field winding 3 can then be energized by moving the switch 38 to the "on" contact 39, the operation being as previously described. In normal operation, if it is desired to remove excitation from the generator 1, it is only necessary to move the switch 38 from the contact 39 to the contact 40, which interrupts the energizing circuit of the field relay 6 and causes it to disconnect the field winding 3 from the bus 7. This operation does not, however, deenergize the lockout relay 33, so that the system remains in the condition shown in the drawing, ready to reenergize the field 3 by operation of the switch 38. It will be noted that the indicating light 45 is not lighted when the field winding 3 is deenergized manually, since the lockout relay 33 is not deenergized and the contact 37 remains open. Thus, the light 45 is lighted only when the system is tripped by operation of the overvoltage relay 18 and gives a reliable indication that an overvoltage condition has occurred.

It should now be apparent that a control and protective system has been provided for alternating current generators which provides positive and reliable protection against generator overvoltage, but which will not operate on the transient overvoltage which occurs during the initial buildup period, and which is electrically trip-free so that excitation cannot be reapplied to the generator after operation of the protective system until the system is manually reset. The time-delay relay 25 prevents operation on the initial transient overvoltage by temporarily rendering the overvoltage relay 18 inoperative during the initial buildup period but restores it to operativeness immediately thereafter. The operation of the time-delay relay to interrupt the sensing circuit of the overvoltage relay also insures that the overvoltage relay will drop out after operation regardless of the value of residual voltage of the generator. The lockout relay 33 provides the desired trip-free operation and also makes it possible to utilize the indicating light 45 as a reliable indication that an overvoltage has occurred and caused tripping of the field relay. Thus a very desirable and effective control and protective system is provided which is especially adapted for use with machines designed for operation over a wide speed range, although it will be apparent that its usefulness is not limited to this particular type of machine, or to the particular type of generator and excitation system shown in the drawing. An illustrative embodiment of the invention has been shown and described, but it will be obvious that various modifications and other embodiments are possible within the scope of the invention, and it is to be understood, therefore, that the invention is not limited to the specific details and circuit connections shown, but in its broadest aspects it includes all equivalent embodiments which come within the scope of the appended claims.

I claim as my invention:

1. A control system for an alternating-current generator having a field winding, said control system including field relay means for controlling the connection of said field winding to a source of direct current excitation, means for energizing said field relay means to effect connection of the field winding to said source, voltage-responsive relay means for effecting deenergization of the field relay means in response to generator voltage in excess of a predetermined value, and relay means adapted to render said voltage-responsive relay means inoperative upon deenergization of the field relay means, said last-mentioned relay means being adapted to restore the voltage-responsive relay means to operativeness with a predetermined time delay upon energization of the field relay means.

2. A control system for an alternating-current generator having a field winding, said control system including field relay means for controlling the connection of said field winding to a source of direct-current excitation, means for energizing said field relay means to effect connection of the field winding to said source, voltage-responsive relay means connected to respond to the voltage of the alternating-current generator and adapted to effect deenergization of the field relay means when the generator voltage exceeds a predetermined value, and relay means adapted to interrupt said connection of the voltage-responsive relay means upon deenergization of the field relay means, said last-mentioned relay means being adapted to reestablish said connection with a predetermined time delay upon energization of the field relay means.

3. A control system for an alternating-current generator having a field winding, said control system including field relay means for controlling the connection of said field winding to a source of direct-current excitation, means for energizing said field relay means to effect connection of the field winding to said source, voltage-responsive relay means having an operating coil connected across the voltage of the alternating-current generator and being adapted to effect deenergization of the field relay means when the generator voltage exceeds a predetermined value, and relay means having a contact connected in series with the operating coil of the voltage-responsive relay means, the field relay means being adapted to effect actuation of said last-mentioned relay means to open its contact when the field relay means is deenergized, the last-mentioned relay means being adapted to reclose its contact with a predetermined time delay when the field relay means is energized.

4. A control system for an alternating-current generator having a field winding, said control system including field relay means for controlling the connection of said field winding to a source of direct-current excitation, means for energizing said field relay means to effect connection of the field winding to said source, voltage-responsive relay means having an operating coil connected across the voltage of the alternating-current generator and being adapted to effect deenergization of the field relay means when the generator voltage exceeds a predetermined value, and relay means having a contact connected in series with the operating coil of the voltage-responsive relay means, the field relay means including means for controlling the energization of said last-mentioned relay means and being adapted to effect energization of said relay means to open its contact when the field relay means is deenergized, the last-mentioned relay means being adapted to reclose its contact with a predetermined time delay when it is deenergized by energization of the field relay means.

5. A control system for an alternating-current generator having a field winding, said control system including field relay means for effecting connection of said field winding to a source of direct-current excitation, relay means for controlling the energization of said field relay means, means responsive to the voltage of the alternating-current generator for controlling said relay means to effect deenergization of the field relay means when said voltage exceeds a predetermined value, and means for rendering said voltage-responsive means inoperative upon deenergization of the field relay means and for restoring the voltage-responsive means to operativeness with a predetermined time delay upon energization of the field relay means.

6. A control system for an alternating-current generator having a field winding, said control system including field relay means for effecting connection of said field winding to a source of direct-current excitation, relay means for controlling the energization of said field relay means, means responsive to the voltage of the alternating-current generator for controlling said relay means to effect deenergization of the field relay means when said voltage exceeds a predetermined value, means for rendering said voltage-responsive means inoperative upon deenergization of the field relay means and for restoring the voltage-responsive means to operativeness with a predetermined time delay upon energization of the field relay means, and manual means for effecting energization of the relay means and for completing an energizing circuit for the field relay means.

7. A control system for an alternating-current generator having a field winding, said control system including field relay means for effecting connection of said field winding to a source of direct-current excitation, relay means for controlling the energization of said field relay means, voltage-responsive means connected to respond to the voltage of the alternating-current generator for controlling said relay means to effect deenergization of the field relay means when said voltage exceeds a predetermined value, and means for interrupting said connection of the voltage-responsive means upon deenergization of the field relay means and for reestablishing the connection with a predetermined time delay upon energization of the field relay means.

8. A control system for an alternating-current generator having a field winding, said control system including field relay means for effecting connection of said field winding to a source of direct-current excitation, relay means for controlling the energization of said field relay means, a voltage-responsive relay having an operating coil connected to respond to the voltage of the alternating-current generator, the voltage-responsive relay being adapted to control said relay means to effect deenergization of the field relay means when said voltage exceeds a predetermined value, and a time-delay relay having a contact connected in series with the operating coil of the voltage-responsive relay, the field relay means being adapted to effect actuation of the time-delay relay to cause it to open its contact upon deenergization of the field relay means, the time-delay relay being adapted to reclose its contact with a predetermined time delay upon energization of the field relay means.

9. A control system for an alternating-current generator having a field winding, said control system including field relay means for effecting connection of said field winding to a source of direct-current excitation, relay means for controlling the energization of said field relay means, a voltage-responsive relay having an operating coil connected to respond to the voltage of the alternating-current generator, the voltage-responsive relay being adapted to control said relay means to effect deenergization of the field relay means when said voltage exceeds a predetermined value, a time-delay relay having a contact connected in series with the operating coil of the voltage-responsive relay, the field relay means being adapted to effect actuation of the time-delay relay to cause it to open its contact upon deenergization of the field relay means, the time-delay relay being adapted to reclose its contact with a predetermined time delay upon energization of the field relay means, and manual means for effecting energization of the relay means which controls the field relay means and for completing an energizing circuit for the field relay means.

10. A control system for an alternating-current generator having a field winding, said control system including field relay means for effecting connection of said field winding to a source of direct-current excitation, a lockout relay connected to control an energizing circuit for said field relay means, a voltage-responsive relay responsive to the voltage of the alternating-current generator, said voltage-responsive relay being connected to control an energizing circuit for the lockout relay and being adapted to interrupt said energizing circuit to cause the lockout relay to effect deenergization of the field relay means when said voltage exceeds a predetermined value, and means for rendering said voltage-responsive means inoperative upon deenergization of the field relay means and for restoring the voltage-responsive means to operativeness with a predetermined time delay upon energization of the field relay means.

11. A control system for an alternating-current generator having a field winding, said control system including field relay means for effecting connection of said field winding to a source of direct-current excitation, a lockout relay connected to control an energizing circuit for said field relay means, a voltage-responsive relay responsive to the voltage of the alternating-current generator, said voltage-responsive relay being connected to control an energizing circuit for the lockout relay and being adapted to interrupt said energizing circuit to cause the lockout relay to effect deenergization of the field relay means when said voltage exceeds a predetermined value, means for rendering said voltage-responsive means inoperative upon deenergization of the field relay means and for restoring the voltage-responsive means to operativeness with a predetermined time delay upon energization of the field relay means, and manual means for effecting energization of the lockout relay and for completing the energizing circuit of the field relay means.

12. A control system for an alternating-current generator having a field winding, said control system including a field relay for effecting connection of the field winding to a source of direct-current excitation, a lockout relay having a contact connected in an energizing circuit for said field relay, manual means for completing an energizing circuit for the lockout relay to cause it to close its contact and for completing the energizing circuit of the field relay to cause it to connect the field winding to the direct-current source, the lockout relay also having means for maintaining its energizing circuit, a voltage-responsive relay having a contact connected in the energizing circuit of the lockout relay, said voltage-responsive relay being adapted to open its contact when the voltage of the alternating-current generator exceeds a predetermined value, and means for rendering said voltage-responsive means inoperative upon deenergization of the field relay means and for restoring the voltage-responsive means to operativeness with a predetermined time delay upon energization of the field relay means.

13. A control system for an alternating-current generator having a field winding, said control system including a field relay for effecting connection of the field winding to a source of direct-current excitation, a lockout relay having a contact connected in an energizing circuit for said field relay, manual means for completing an energizing circuit for the lockout relay to cause it to close its contact and for completing the energizing circuit of the field relay to cause it to connect the field winding to the direct-current source, the lockout relay also having means for maintaining its energizing circuit, a voltage-responsive relay having a contact connected in the energizing circuit of the lockout relay, said voltage-responsive relay being connected to respond to the voltage of the alternating-current generator and being adapted to open its contact when said voltage exceeds a predetermined value, and means for interrupting said connection of the voltage-responsive means upon deenergization of the field relay means and for reestablishing the connection with a predetermined time delay upon energization of the field relay means.

14. A control system for an alternating-current generator having a field winding, said control system including a field relay for effecting connection of the field winding to a source of direct-current excitation, a lockout relay having a contact connected in an energizing circuit for said field relay, manual means for completing an energizing circuit for the lockout relay to cause it to close its contact and for completing the energizing circuit of the field relay to cause it to connect the field winding to the direct-current source, the lockout relay also having means for maintaining its energizing circuit, a voltage-responsive relay having a contact connected in the energizing circuit of the lockout relay, said voltage-responsive relay having an operating coil connected to respond to the voltage of the alternating-current generator and being adapted to open its contact when said voltage exceeds a predetermined value, and a time-delay relay having a contact connected in series with the operating coil of the voltage-responsive relay, the field relay means being adapted to effect actuation of the time-delay relay to cause it to open its contact upon deenergization of the field relay means, the time-delay relay being adapted to reclose its contact with a predetermined time delay upon energization of the field relay means.

References Cited in the file of this patent

UNITED STATES PATENTS

| Number | Name | Date |
|---|---|---|
| 2,522,601 | Brown | Sept. 19, 1950 |